US008027662B1

(12) United States Patent
Miller et al.

(10) Patent No.: US 8,027,662 B1
(45) Date of Patent: Sep. 27, 2011

(54) PARENTAL MONITORING VIA CELL PHONES WITH MEDIA CAPTURE AND LOCATION REPORTING

(75) Inventors: Kristen Miller, Olathe, KS (US); Michael Lundy, Olathe, KS (US); Harry H. Lai, Overland Park, KS (US); Balaji S. Thenthiruperai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 609 days.

(21) Appl. No.: 11/360,092

(22) Filed: Feb. 22, 2006

(51) Int. Cl.
*H04M 1/66* (2006.01)
*H04W 24/00* (2009.01)

(52) U.S. Cl. ....... 455/410; 455/456.1; 455/17; 455/457; 455/556.1; 455/404.2

(58) Field of Classification Search .......... 455/410–411, 455/404.12, 456.1
See application file for complete search history.

(56) References Cited

U.S. PATENT DOCUMENTS

| 5,812,865 A * | 9/1998 | Theimer et al. ............... 709/228 |
| 6,785,935 B2 | 9/2004 | Ahn et al. ........................ 16/221 |
| 6,792,717 B2 | 9/2004 | Carlsson et al. ................ 49/218 |
| 6,823,198 B2 | 11/2004 | Kobayashi ................. 455/556.1 |
| 6,944,466 B2 | 9/2005 | Bi et al. ..................... 455/456.1 |
| 6,952,574 B2 | 10/2005 | Tealdi et al. ............... 455/404.2 |
| 6,972,717 B2 | 12/2005 | Sollenberger et al. ........ 342/387 |
| 6,990,345 B2 | 1/2006 | Kuwahawa et al. .......... 370/360 |
| 7,113,126 B2 * | 9/2006 | Durst et al. .............. 342/357.07 |
| 7,693,545 B2 * | 4/2010 | Park .......................... 455/556.1 |
| 2005/0226468 A1 | 10/2005 | Deshpande .................. 382/115 |
| 2007/0184845 A1 * | 8/2007 | Troncoso ................... 455/456.1 |
| 2008/0227473 A1 * | 9/2008 | Haney ........................... 455/457 |

* cited by examiner

*Primary Examiner* — Charles Appiah
*Assistant Examiner* — Emem Stephen

(57) ABSTRACT

A method for obtaining media at a first communications device (e.g., that of a parent) from a wireless communications device (e.g., one being used by a child), includes steps of receiving a message from the first device at the wireless communications device, the message causing the wireless communications device to display a prompt for the user to capture media (e.g., photo, voice sample, or biometrical sample) with the device, obtaining current location information for the wireless communications device; and automatically transmitting the media from the second device to the first device along with the current location information.

6 Claims, 4 Drawing Sheets

PARENTAL MONITORING VIA CELL PHONES WITH MEDIA CAPTURE AND LOCATION REPORTING

BACKGROUND

A. Field

This invention relates generally to the field of applications for wireless communications devices (e.g., cell phones, personal digital assistants, and the like). More particularly, it relates to methods by which one communications device, which may also comprise a wireless communications device or a personal computer, may obtain media captured by a second wireless communications device along with information as to the location of the second wireless communications device. The methods are particularly useful in the context of parental monitoring of a minor child where the child has a cell phone having either camera or biometric media capture functionality.

B. Related Art

It is generally known today for wireless communication devices, such as cell phones and wirelessly equipped computing devices such as personal digital assistants (PDAs) and laptop computers to be able to engage in wireless packet-data communications and to thereby wirelessly send and receive messages and other content from land-based network entities and other wireless communications devices.

Wireless communications devices such as cell phones often have a camera built into the housing which can be used to captures digital images. Such images can be transmitted across a wireless network, e.g., as an attachment to an email message. See e.g., U.S. Pat. Nos. 6,823,198 and 6,785,935.

It is also known in the art that the location of a wireless communications device can be ascertained using a variety of different techniques. In one technique, the device includes a Global Positioning System (GPS) satellite receiver and obtains latitude and longitude coordinates from orbiting GPS satellites. In other techniques, the position of a wireless communications device can be determined by means of triangulation algorithms and/or signal delay measurements, making use of Radio Frequency (RF) communications between the wireless device and base station antennae in a radio access network. See, e.g., U.S. Pat. Nos. 6,990,345; 6,972,717; 6,952,574 and 6,944,466.

The present invention takes advantage of the location determination capability of wireless communications devices and the ability of such devices to capture media (e.g., photographs) in new and unexpected ways to enable a wireless communications device such as a cell phone to be a useful tool to assist parents in monitoring their children.

SUMMARY

The present inventors have appreciated that parental monitoring of children can be facilitated by sending a message to a wireless communications device (e.g., cell phone) used by the child which prompts the child to capture one or more photographs using a camera built into the device. Alternatively, the child could be prompted to capture (record) other biometrical data, such as a voice sample or a thumbprint using a speaker on the device or a biometrical thumb print reader incorporated into the device. In the case of a camera, the child is typically prompted to photograph themselves and/or their surroundings. Meanwhile, the device automatically acquires information as to its current geographical location. The device then sends back to the parent's communication device: (1) the photo(s) (or other biometrical media data), as well as (2) information as to where the wireless communications device is located at the time the photograph is captured. For example, if the child is teenager and is out late at night, the parents can determine from the photograph the environment the teenager is in, as well as their location. The location of the child is determined without requiring any input from the child (thereby preventing falsification of the location), because the location is determined automatically by the wireless device. In one possible embodiment, the message which prompts the child to take the picture also causes a partial disabling of the wireless communications, e.g., the device cannot receive or make any telephone calls until the child complies with the request to capture the photo.

In the case of biometrical data such as voice or fingerprint, the method may involve transmitting the location data and the biometrical data to a network node that confirms the identity of the child. Such a node may access a secure database of biometrical information such as voice samples or finger prints, and compares the biometrical data acquired by the child with the information in the database. The node could then forward an "identify confirmed" message to the parent along with the location data.

In one embodiment, a method is provided for obtaining media at a first communications device (e.g., a computer or cell phone used by the parent) from a wireless communications device (e.g., cell phone used by the child). The method includes a first step of receiving a media capture message from the first device at the wireless communications device, the message causing the wireless communications device to display a prompt for the user (e.g. child) to capture media with the device. The media to be captured could comprise voice, photographic media, or biometrical data such as a fingerprint. The media capture message can be thought of as a trigger message. Such message could be transmitted to the child's cell phone in a variety of formats, the details of which are not important, such as by SMS message, a MMS message, or as a peer to peer message (PTT)

The method continues with a step of obtaining location information for the wireless communications device, e.g., using a GPS receiver built into the phone or by means of triangulation or signal delay algorithms. The method continues with a step of automatically transmitting the media (e.g., photo of the child or their surroundings) from the second device to the first device along with the location information.

In one embodiment, the location information is obtained in one format (e.g., latitude and longitude, or cell and sector data) and needs to be converted to a more user-friendly format for the parents. In this embodiment, the media and location information is sent via the wireless communications network to a location server and associated database. The database takes the location information obtained from the wireless communications device and converts it into street address information. The location server then forwards the street address information and the photo to the parent's communication device (e.g., computer or cell phone.)

In one embodiment, particularly where the child captures biometrical media such as a voice sample or a digital fingerprint, the location and media data could be sent to an intermediate network node that confirms the identify of the child by comparison of the biometrical media to information in a database. The node then sends an "identity confirmed" or "identity not confirmed" message to the parent along with the location data.

In one preferred embodiment, the wireless device used by the child is partially disabled when the media capture message is received. For example, the media capture message causes the receive function of the cell phone to be disabled, such that the phone cannot receive any calls. As another example, the transmit function of the phone could be disabled such that the phone can only be used to call an emergency number (911), or the parents' home and cell phone numbers. As another example, all game playing or Internet browsing functionality is disabled. The disability could be a configurable parameter in the service described herein.

The disability of the device can be removed, for example when the child complies with the request by capturing the requested media and sending it to the parents. Alternatively, the disability could be removed after the parents receive the media and location information, and then send a further message which removes the disability. Alternatively, the disability could be removed when a network node confirms the identity of the child as described above and transmits a remove disability message to the child's cell phone.

In another aspect, an improvement is provided in a wireless communications device such as a cellular telephone equipped with a camera. The device has a camera, transmit and receive circuitry for communication over an air interface with a wireless communication network, a display, and a processor and a memory storing instructions for execution by the processor. The improvement comprises storing instructions in the memory which provide for the device performing the following functions:

(1) receiving a media capture message via the receive circuitry and responsively causing the display to display a prompt for the user of the wireless communications device to capture media with the device (e.g., photo, voice sample, fingerprint, etc.);

(2) automatically obtaining location information for the wireless communications device;

(3) partially disabling the wireless communications device in response to the receipt of the message; and (4) transmitting the captured media and the location information from the wireless communications device to the wireless communication network via the transmit circuitry.

While this summary and the following detailed description describe an embodiment in which a parent is monitoring a child, the invention is of course applicable to other situations and the explanation is provided by way of example and not limitation.

DETAILED DESCRIPTION OF PREFERRED EMBODIMENT

Figure 1:
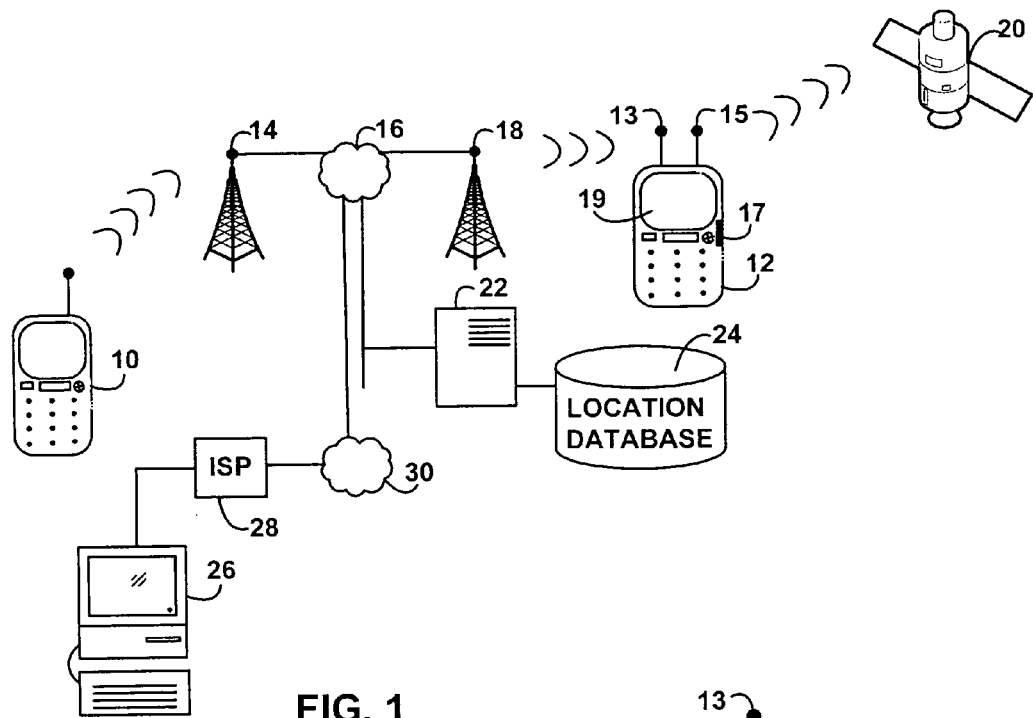
FIG. 1 is an illustration of a wireless communications environment in which the invention may be practiced.

FIG. 1 is an illustration of an environment in which a parent may exercise some parental monitoring of a child when the child is equipped with a cell phone or other like wireless communications device with media capture functionality. In FIG. 1, the parent has their own communications device, which may take the form of a cell phone 10 or a personal computer 26. The child is using cell phone 12. The method of operation of the invention will be described initially in an embodiment in which the parent is using the cell phone 10.

The cell phone 10 communicates in known fashion over an air interface with a base station antenna 14, which is coupled to a wireless service provider network 16. Intermediate network and switching elements such as base station controllers, mobile switching centers, etc. are omitted from the illustration in order to avoid obfuscation of the thrust of this disclosure. The network 16 (and intermediate switching nodes) allows the parents to call or send messages to the wireless communications device 12 used by the child. Such communications may use a base station antenna 18 that is in proximity to the device 12. The device 12 includes a CDMA wireless antenna 13 for receiving and transmitting data via the base station antenna 18. The device 12 also includes a GPS receiver (not shown) and associated antenna 15 for receiving positional data from orbiting GPS satellites, one of which (20) is shown in FIG. 1.

Figure 2:
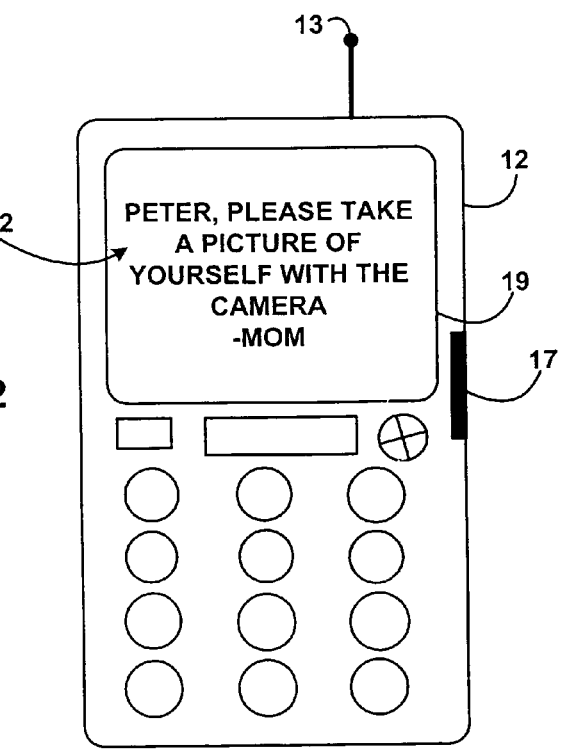
FIG. 2 is an illustration of a wireless communications device in the form of a cell phone equipped with a camera which includes a display displaying a prompt for the user of the device to capture media.

The device 12 includes a conventional digital camera 17, speaker, microphone, and a display 19 for displaying text messages and video images. In alternative embodiments, the device 12 includes a biometrical media capture device such as a biometrical thumb print reader for capturing and digitizing a fingerprint. The display, camera, GPS receiver and transmit and receive capabilities of the device 12 are conventional. A phone of the type shown in FIG. 1 is commercially available from various providers in the industry and/or described in the patent literature. The method described below makes use a media capture message which is sent from the parent's cell phone 10 and received on the child's cell phone 12, which causes a prompt to appear on the display 19. One example of such a prompt is shown in FIG. 2 at 32.

In one embodiment, the parent using cell phone 10 wishes to check up on their child and to do so uses the child's cell phone 12 as a monitoring tool. The process works as follows and as explained in FIG. 3.

First, at step 40, the parent generates and transmits a media capture or trigger message to the child's cell phone. Basically the message is designed to prompt the recipient (child) to capture media and report the location of the cell phone. The media to capture could take the form of a picture of themselves or their surroundings (or anything else desired by the parent). Alternatively, the media to capture could be a voice sample or other biometrical data for purposes of identifying the child as discussed further below. The manner in which this step may be performed can vary widely. In one possible embodiment, the parent launches a monitoring application on their cell phone 10 and, using the buttons on the device, types in or selects a prompt message, selects the telephone number for their child's cell phone and then hits "send." The application generates a message which includes the prompt and sends it over the RF interface to the cellular network 16 (FIG.

1) where it is forwarded to the child's cell phone 12. In another embodiment, where the parent is on a computer 26 connected to the Internet 30 via an Internet service provider 28, they invoke a monitoring application on the computer, generate a media capture request message and transmit it, e.g., as an email or SMS message to the phone 12. Other messaging formats such as PTT or MMS are also possible.

At step 42, the media capture message is received at the child's cell phone 12. The message preferably includes some header information, flag, or other aspect which identifies the message as a media capture message and thereafter triggers the subsequent processing steps. For example, the message generated at step 40 may include a bit or flag which is recognized by an application running on the child's cell phone 12 which indicates that the incoming message is a media capture message. In response, the phone 12 includes an application (e.g., monitoring application) that responsively causes processes 44, 46 and 48 to occur automatically on the child's cell phone 12.

At step 44, the processor running on the cell phone 12 generates a media capture prompt in accordance with the text or message input by the parent and displays it on the display 19, as shown in FIG. 2.

At step 46, the functionality of phone 12 is partially disabled, in order to act as an inducement for the child to comply with the media capture request. The particular disability is configurable, and subject to variation depending on implementation. In one embodiment, the phone 12 cannot make any outgoing calls except for calls to an emergency number such as 911. As another possibility, the only outgoing calls allowed are 911 calls and calls to the parent's phone number. As another possibility, no incoming calls are allowed. As another possibility, all game playing applications and Internet browsing are disabled. Step 46 is optional.

At step 48, the phone 12 automatically acquires location information, i.e., the current geographic location of the phone 12 (and, indirectly, the location of the child). This may be achieved by acquisition of GPS signals from the orbiting satellites 20 (FIG. 1). Alternatively, the location of the device 12 could be obtained from a network entity using the techniques described in the previously referenced patents or other techniques known in the art, e.g., using delay measurements and triangulation algorithms applied to signals received from the phone 12 by base station antennae in the wireless network. In the later scenario, the phone 12 could generate a location query message, send it over the RF interface to a location server on the wireless network, and receive a response message indicating at least approximately the location of the device.

At step 50, the user captures the media as requested by the prompt (step 44). For example, the child operates the camera 17 (FIG. 2) on the phone and takes a picture of themselves or their surroundings. Obviously, the media capture could consist of a single picture or could comprise multiple pictures. As noted above other media capture is possible.

Figure 4:
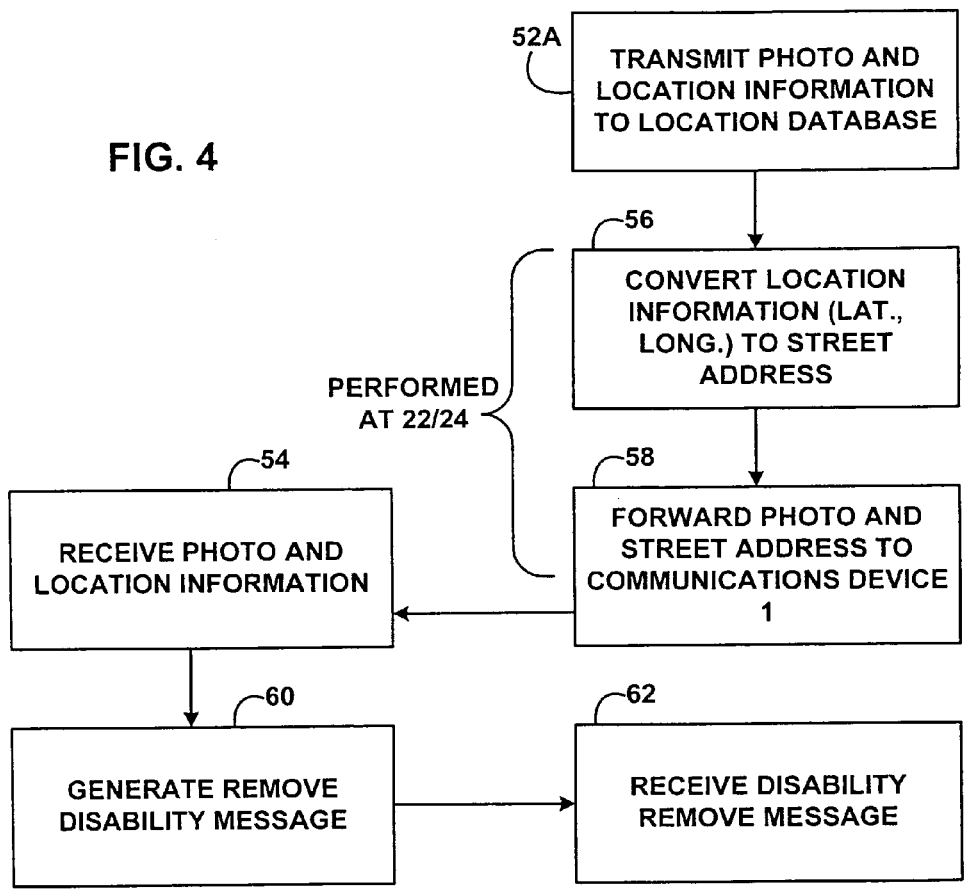
FIG. 4 is an alternative embodiment to the operations of FIG. 3 in which the location information and captured media are transmitted to an intermediate location server and associated database, which converts the location information into a street address.

At step 52, the disabling of the phone functionality imposed at step 46 is removed. Such removal could be triggered by the capture of the image at step 50 automatically. An alternative arrangement for removing the disability is shown in FIG. 4 and will be described subsequently.

At step 53, the phone 12 generates automatically a message which includes both the location information and the media captured at step 50 and transmits it to the parent's cell phone 10. See FIG. 5 and the discussion below. Alternatively, the location and media could be sent to an intermediate network server or node that confirms the identity of the child, by reference to a database of biometrical data.

At step 54, the parent receives the media (in the case of the photograph) or "id confirmed" message in the case of the capture of biometrical data, and the location information. Having this information in hand, the parents can thus get some information on the condition and location of their child and exercise at least some parental monitoring. If they were unhappy with the location, they could conceivably go there to meet the child, or send a police officer to do the same, or call the child and ask them to come home or take some other action.

In one embodiment, the location information provided in the response message 53 could be latitude and longitude coordinates. While it is possible for the parents to use such information and convert it to a street address, either using mapping software stored locally on their computer or cell phone or using resources on a computer network, in a more preferred embodiment the location information sent at step 53 is converted to a street address by an intermediate network node prior to receipt by the parent's phone 10. That way, when the message arrives that includes both the captured media and the location information, the location information is readily useable and understandable by the parents.

FIGS. 1 and 4 show one embodiment of how this might be performed. In FIG. 1, the wireless service provider network 16 includes a location server 22 and attached location database 24. The database 24 is a mapping database that converts geographic coordinates (e.g., latitude and longitude) to street addresses. Such databases are known in the art and used in GPS land navigation and mapping applications which are commercially deployed in rental cars, as OEM equipment in luxury automobiles, and as an aftermarket accessory. The database also preferably has the software to convert position information which is not in latitude/longitude format into street coordinates, for example in the case where the wireless device 12 obtains positional data but via means other than GPS signals. For example, the server 22 and database 24 operate to convert one format (such as cell/sector data) into latitude and longitude, and then query the database 24 using the latitude and longitude. Alternatively, the database may also contain data which converts cell/sector or other forms of positional information to street coordinates using techniques which are known in the art.

Referring again to FIG. 4, at step 53A, the wireless device 12 transmits the position information and captured media to the location server 22. At step 56, the location server and/or database 24 converts the location information into a street address. At step 58, the server 22 forwards the media and street address information to the parent's communication device 10. The communication device 10 receives the location and media at step 54.

In the embodiment of FIG. 4, the disability previously placed on the phone 12 at step 46 (FIG. 3) is not removed until after the location data and media has been received at the parent's phone 10, in order to give the parents a chance to confirm that the child has taken an adequate picture of themselves, are satisfied with the location of the child, or for other reason delay or defer the removing of the disability. Suppose the parents are satisfied with the media and the current location. At step 60, the parent generates and sends a remove disability message (e.g., using the monitoring application referred to previously). At step 62, the remove disability message is received at the child's phone 12 and the monitoring application then removes the disability that was previously placed on it (step 46 in FIG. 3).

Figure 3:
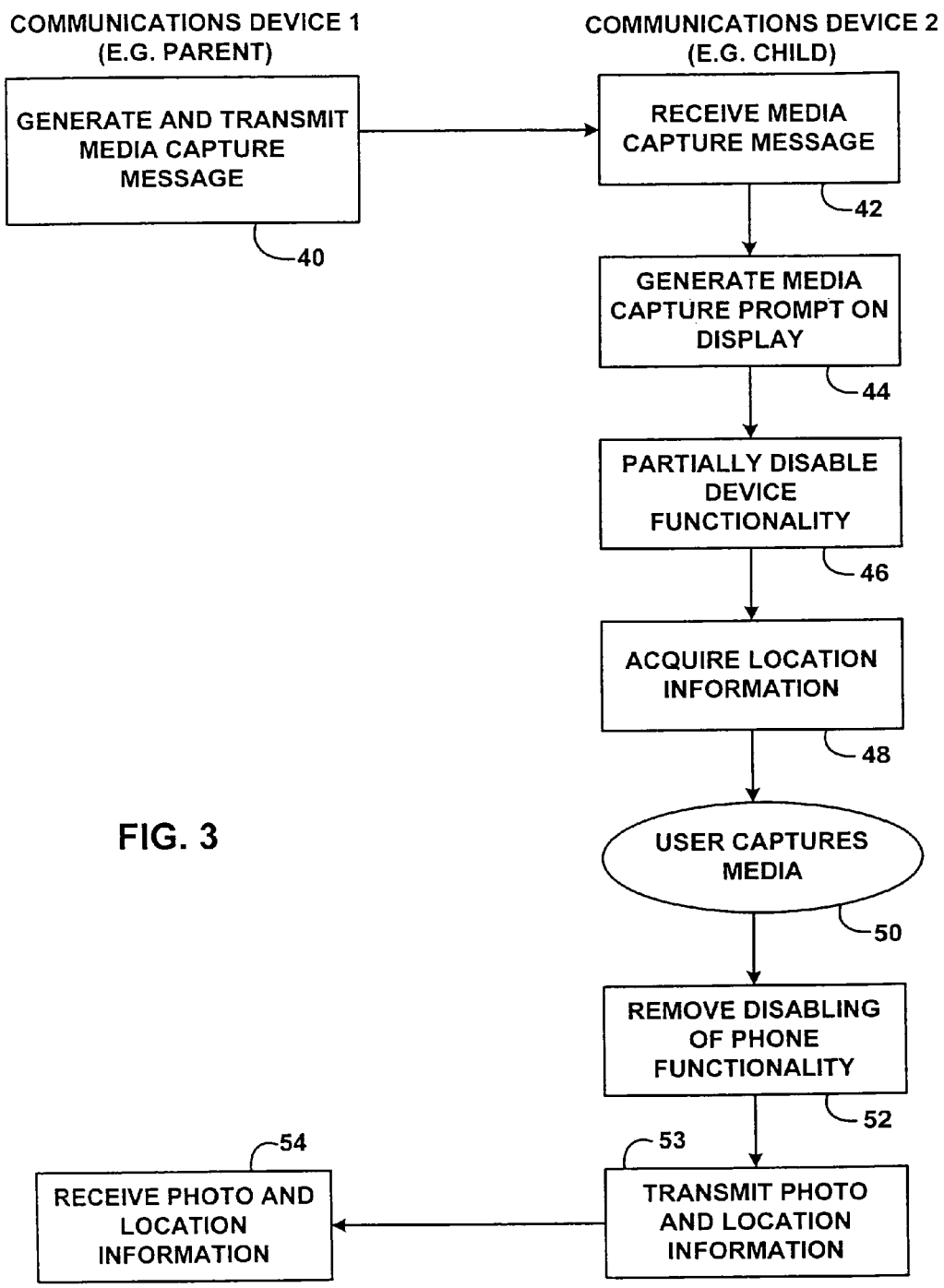
FIG. 3 is a flow chart showing a sequence of operations performed on the wireless communications device of FIG. 2 wherein the device receives a message to capture media with a camera, prompts the user to capture the media, obtains location information and provides the media and the location information to the requesting communications device.
Figure 5:
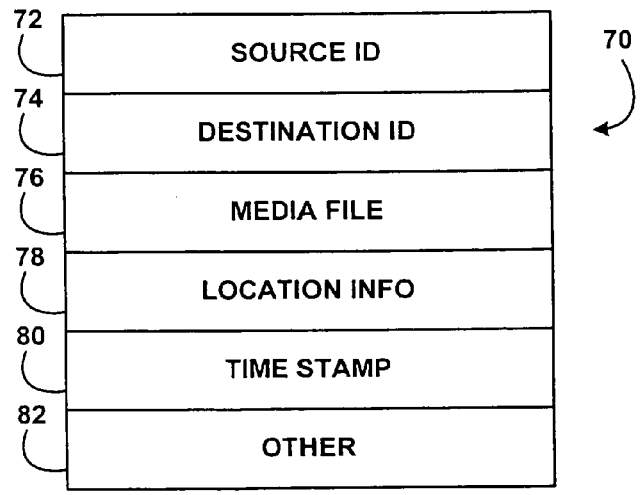
FIG. 5 is an illustration of a message format for a message in response to the media capture message, including fields for the captured media and the location information.

FIG. 5 is a diagram of one possible format for a message 70 which is generated at the child's phone in step 53 of FIG. 3 or step 53A of FIG. 4. The message includes a source Id field 72, which includes information identifying the child's cell phone, such as the phone number, Electronic Serial Number (ESN), IP address, or other identifying information. Field 74 identifies the destination address, which could be the phone number of the parent's phone 10, an IP address of the parent's computer 26 (FIG. 1) in the event that the parent wishes to monitor the child using their home computer instead of using their phone, or the network address of the location server 22 (FIG. 1).

Field 76 includes a media field storing data representing the images captured with the camera on the phone 12.

Field 78 includes location information indicating where (geographically speaking) the phone 12 is at the time the pictures are taken (or the time when the media capture message is received).

Filed 80 includes a time stamp indicating when the message 70 was generated. Field 80 is optional.

Field 82 contains any other information as may be pertinent or desired.

Figure 6:
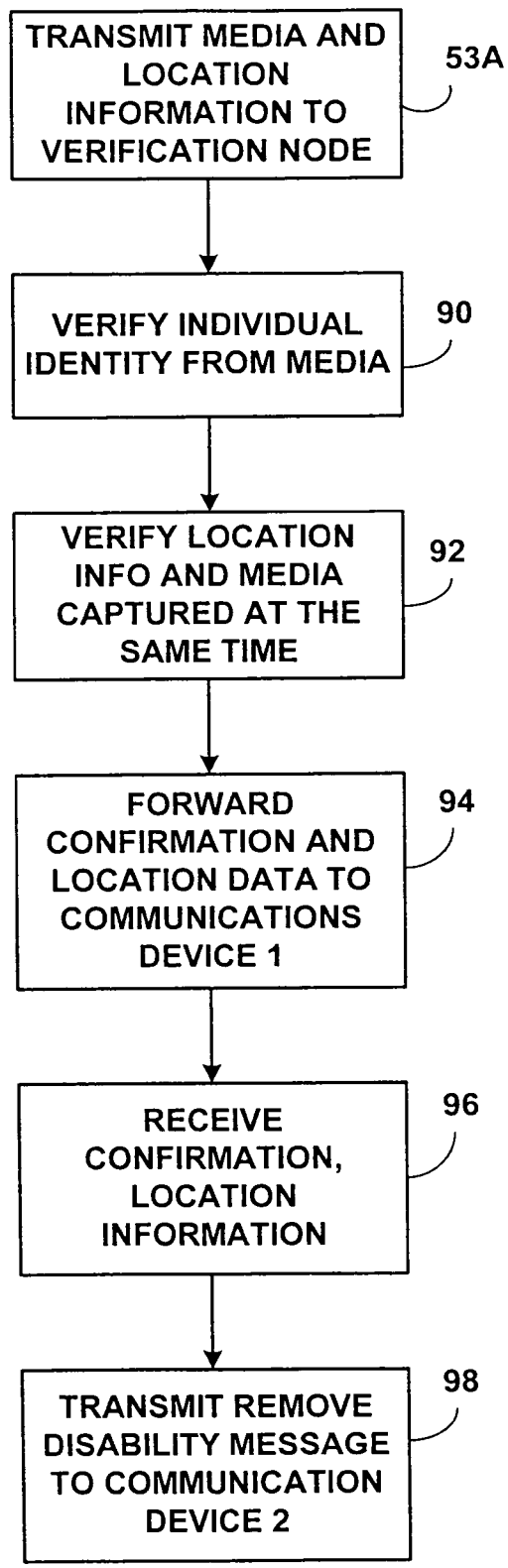
FIG. 6 is a flow chart showing an alternative embodiment in which an intermediate network node confirms the identity of the child in the situation where the media capture message prompts the child to capture biometrical media such as a voice sample or a fingerprint via biometrical finger print reader incorporated into the child's device.

FIG. 6 shows a sequence of processing steps that would occur in the situation where the child is prompted to capture biometrical data such as a voice print or thumb print. At step 53A, the child's device 12 transmis the media and the location to a verification node, which may take the form of a network server on the wireless service provider network or other form. Such verification node could be co-located with the node 22 of FIG. 1. At step 90, the biometrical data contained in the message of step 53A is then compared to biometrical data stored in a database associated with the verification node. A verification of the identify of the child thus occurs. At step 92, node verifies that both the biometrical data and the location data were acquired at substantially the same time (say, within 5 minutes of each other). This is to prevent circumvention of the monitoring procedure by using a stored voice print. At step 94, the node forwards the location and the confirmation to the parent's communication device (PC or cell phone.) At step 96, the parents' communication device receives the location information and the confirmation. If they are satisfied, they can transmit a remove disability message to the child's communication device as indicated at step 98.

From the foregoing, it will be appreciated that we have disclosed an improvement to a wireless communications device 12 having a camera 17, transmit and receive circuitry (conventional, not shown) for communication over an air interface with a wireless communication network 16, a display 19, and a processor and a memory storing instructions for execution by the processor (conventional, not shown), the improvement comprising storing instructions in the memory which provide for the device performing the following functions:

(1) receiving a media capture message (FIG. 3, 42) via the receive circuitry and responsively causing the display 19 to display a prompt for the user of the wireless communications device to capture media with the camera (FIG. 2), (2) automatically obtaining location information for the wireless communications device (FIG. 3, 48);

(3) partially disabling the wireless communications device in response to the receipt of the message (FIGS. 3, 46); and (4) transmitting the captured media and the location information from the wireless communications device to the wireless communication network via the transmit circuitry (FIG. 3, 43, FIG. 4, 53A).

While presently preferred and alternative embodiments have been described, variation from the illustrated embodiments is possible without departure from the scope of the invention. The scope is to be determined by reference to the appended claims.

We claim:

1. A method for obtaining media at a first communications device from a wireless communications device, comprising the steps of:

receiving a message from the first communications device at the wireless communications device, the message causing the wireless communications device to display a prompt for a user of the wireless communications device to capture media with the wireless communications device;

obtaining current location information for the wireless communications device; and automatically transmitting the media from the wireless communications device to the first communications device along with the current location information;

wherein the first communications device comprises a computer or cellular phone used by a person in position of authority over the user of the wireless communications device, wherein the message includes a feature partially disabling the wireless communications device, wherein the partial disabling is removed when the transmitting step is performed, and wherein the partial disabling comprises limiting the ability of the wireless communications device to do at least one of the following: make outgoing phone calls, receive incoming calls, send or receive text messages, allow a user to play games on the wireless communications device, and allow a user to access the Internet with the wireless communications device.

2. The method of claim 1, wherein the transmitting step includes the step of transmitting the media and the location information to an intermediate node between the wireless communications device and the first communications device, and wherein the intermediate node converts the location information into a street address.

3. The method of claim 1, wherein the message prompts the user of the wireless communications device to capture at least one of a photograph of the user, a voice sample, and a biometric sample.

4. The method of claim 1, wherein the method further comprises the step of determining whether the media is captured at substantially the same time as the obtaining of the location data.

5. In a wireless communications device having a camera, transmit and receive circuitry for communication over an air interface with a wireless communication network, a display, and a processor and a memory storing instructions for execution by the processor, the improvement comprising storing instructions in the memory which provide for the device performing the following functions:

(1) receiving a media capture message via the receive circuitry and responsively causing the display to display a prompt for a user of the wireless communications device to capture media with the camera;

(2) automatically obtaining current location information for the wireless communications device;

(3) partially disabling the wireless communications device in response to the receipt of the message;

(4) transmitting the captured media from the wireless communications device to the wireless communication network via the transmit circuitry; and (5) automatically removing the partial disability of the wireless communications device upon the completion of the transmitting step, wherein the partial disabling comprises limiting the ability of the wireless communications device to do at least one of the following: make outgoing phone calls, receive incoming calls, send or receive text messages, allow a user to play games on the wireless communications device, and allow a user to access the Internet with the wireless communications device.

6. The improvement of claim 5, wherein the location information comprises latitude and longitude coordinates.

* * * * *